United States Patent [19]

Cook

[11] Patent Number: 4,511,151
[45] Date of Patent: Apr. 16, 1985

[54] ONE-PIECE MOUNTING RING FOR SEAL INSERT

[75] Inventor: Thomas E. Cook, Kalamazoo, Mich.

[73] Assignee: Durametallic Corporation, Kalamazoo, Mich.

[21] Appl. No.: 527,898

[22] Filed: Aug. 30, 1983

[51] Int. Cl.$^3$ .............................................. F16J 15/38
[52] U.S. Cl. ............................................. 277/92; 277/85
[58] Field of Search ...................................... 277/92, 85

[56] References Cited

U.S. PATENT DOCUMENTS

| | | | |
|---|---|---|---|
| 2,167,669 | 8/1939 | Moltneux | 277/92 |
| 2,463,695 | 3/1949 | Jensen | 277/92 |
| 2,590,759 | 3/1952 | Dale et al. | 277/92 |
| 2,729,478 | 1/1956 | Chambers et al. | 277/85 |
| 2,995,391 | 8/1961 | Snyder | 277/92 |
| 3,220,741 | 11/1965 | Mueller | 277/92 |
| 3,926,443 | 12/1975 | Fenerty et al. | 277/85 |
| 4,067,708 | 1/1978 | Sakaki | 277/92 |
| 4,239,241 | 12/1980 | Menager | 277/92 |

Primary Examiner—Robert I. Smith
Attorney, Agent, or Firm—Flynn, Thiel, Boutell & Tanis

[57] ABSTRACT

A mechanical seal construction employing a one-piece plastics packing ring of relatively rigid material for creating a sealed relationship between the nonrotatable seal ring and the stuffing box or gland. The packing ring has a main substantially rectangular body portion which defines an inner annular surface of substantial axial extent, which inner surface has a light interference fit with an opposed surface on the nonrotatable seal ring. A thin ringlike rib is integral with and externally surrounds the main body portion and projects radially outwardly therefrom, which rib is disposed in the axially central plane of the main body portion. This rib has the radially outer end or edge surface thereof maintained in a light interference fit with an opposed surrounding surface as defined on the gland or stuffing box. The seal areas are defined adjacent the axial end surfaces of the main body portion, one of which engages an opposed surface on the nonrotatable seal ring, and the other of which engages an opposed surface on either the gland or stuffing box.

9 Claims, 6 Drawing Figures

ONE-PIECE MOUNTING RING FOR SEAL INSERT

FIELD OF THE INVENTION

This invention relates to a mechanical seal construction having an improved packing between the stationary insert and the gland or stuffing box.

BACKGROUND OF THE INVENTION

Mechanical seal assemblies are conventionally utilized on fluid handling equipment such as pumps and the like which are utilized in conjunction with highly corrosive and/or high temperature fluids, such as chemicals, petro-chemicals, steam and the like. The seal assemblies, in their most common mode of usage, are of the "inside" type in that the seal assembly is positioned in surrounding relationship to a rotatable shaft and is disposed within a recess formed in the surrounding housing (commonly referred to as the stuffing box). A stationary gland is conventionally positioned adjacent the outer end of the recess and is fixedly secured to the stuffing box, as by screws. The gland nonrotatably mounts thereon the stationary annular seal member (commonly referred to as the gland insert), which insert supports the nonrotatable seal face ring. To prevent leakage between the gland and the gland insert, an annular packing is provided therebetween.

In many conventional use applications, the mechanical seal is a double assembly in that one seal assembly is disposed adjacent the outer end of the stuffing box for cooperation with the gland, as described above, and a further seal assembly is disposed adjacent the inner end of the stuffing box. This inner seal assembly is of substantially the same construction as the outer seal assembly except that the stationary seal ring (the insert) is seated on the stuffing box, and a packing ring is provided therebetween to prevent leakage from occurring around the outer periphery of the insert.

The packing which is provided between the insert and the gland, or between the insert and the stuffing box, has throughout the years assumed many different configurations and utilized many different materials. In situations where the seal assembly is used in conjunction with noncorrosive or low temperature fluids, then the packing is normally of an elastomeric material having a conventional cross section, such as an O-ring. These use conditions have not created any serious problem relative to installation or use.

However, in use situations where the seal assembly is exposed to corrosive and/or high temperature fluids, elastomers can not be used for the packing, and hence other materials such as Teflon and graphite have been utilized in view of their ability to withstand exposure to the corrosive and/or high temperature fluids. Packing rings constructed of these materials, however, are much more difficult to handle during installation since these materials are relatively rigid and/or inelastic. While they do permit very limited compression, nevertheless packings of these materials do not function like elastomers. Hence, installation of these packings, and hence installation of the mechanical seal assembly, has been a long-standing problem.

More specifically, mechanical seal assemblies are normally installed on the equipment at the job site, and hence installation of the mechanical seal assembly into the stuffing box of the apparatus is essentially a manual operation since not only is the recess within the stuffing box of small dimensions, but the job-site installation prevents utilization of automated or other factory-type equipment for assisting in installation, particularly when press fits are utilized. Hence, when installing a mechanical seal at the inner end of the stuffing box, the installation of the insert, and particularly the positioning of the packing between the stuffing box and the insert, has long been a problem. Because of the length of the stuffing box recess, and the required manual installation of the insert and packing ring, use of a heavy press or interference fit is impossible. Further, the packing often comprises some type of spreader ring arrangement, such as an outer V-shaped Teflon ring having a tapered spreader block inserted therein for effecting expansion of the V-shaped ring into sealing engagement at inner and outer diameters. This type of spreader ring arrangement can be manually installed but does not exert any sufficient holding force. Hence, tilting of the insert relative to the stuffing box, during the installation procedure, has been a long-standing problem.

Similar installation problems are also encountered when the mechanical seal assembly is mounted in a vertical orientation, such as on a mixer shaft or the like, and the gland is disposed uppermost. When a mechanical seal assembly is installed at a job site in a vertical orientation, the installation is again manually performed and the seal components are fitted vertically downwardly over the shaft into the stuffing box. The packing ring, such as the V-ring and spreader, or a graphite packing ring, is manually fitted into the gland, and the insert is then manually fitted into the packing ring. This assembly operation can be manually performed since the insert rests on top of the gland. To then mount the gland and insert onto the apparatus, the installer must turn the gland-insert subassembly upside down so that the insert is directed downwardly, whereupon this subassembly is then vertically moved downwardly over the shaft into position within the stuffing box. During this downward vertical installation, however, the installer must manually hold the insert into the gland or else it will fall out. Needless to say, when the installer can no longer grip the insert, such as when the subassembly is positioned closely adjacent the stuffing box, then often the insert falls out of the gland, prior to proper seating of the subassembly on the stuffing box. This often results in tilting, which prevents proper sealing engagement between the gland and insert.

In an attempt to prevent separation between the gland and insert, such as for vertical installations, others have attempted for many years to utilize Teflon packing rings having a heavy rectangular cross section, which packing ring has a heavy press or interference fit between its radially inner and outer surfaces with the insert and gland, respectively. These arrangements, however, can not be successfully and repetitively manually assembled at the job site in view of the excessive axial pressure force (i.e., approximately 50 to 100 pounds) required to create the interference fits. Further, this arrangement relies on these heavy press fits to create seal areas adjacent the radially inner and outer surfaces of the packing ring.

Accordingly, all of the known packing arrangements as used between the insert and the gland or stuffing box have necessarily resulted in long-standing installation problems and/or have prevented or interfered with the necessary manual assembly and installation of the seal assembly at the job site.

Further, most of these known packings have also relied on radial compression of the packing between the insert and gland (or stuffing box) for creating seal areas adjacent the radially inner and outer walls of the packing. Reliance on these radially inner and outer walls for creating seal areas necessarily increases the required pressure between these walls, which in turn interferes with the successful manual assembly of the insert-gland (or stuffing box) subassembly.

Many of the prior packings, and the problems associated therewith, are explained in greater detail hereinafter with reference to the accompanying drawings.

Accordingly, it is an object of this invention to provide an improved packing for a mechanical seal, specifically a packing which coacts between the insert and the gland or stuffing box, which packing is usable for corrosive and/or high temperature fluids and greatly facilitates manual assembly and installation of the seal assembly into the stuffing box, both in a vertical and a horizontal orientation, and hence overcomes the many disadvantages associated with prior packings.

More specifically, it is an object of this invention to provide an improved packing which coacts between the insert and the gland or stuffing box, which packing is a Teflon ring having a substantially rectangular cross section. The ring on the radially outer periphery thereof is provided with an encircling rib which is integral therewith and projects radially outwardly thereof. This rib creates an interference or press fit with an internal annular wall formed on the gland or stuffing box to permit the packing ring and the gland or stuffing box to be securely locked together, while at the same time enabling this pressure fit to be accomplished manually at the job site using only light finger pressure (i.e., an axial pressure force of up to approximately 10 pounds) for effecting the assembly. This can hence be easily accomplished, and can be uniformly applied around the ring to avoid distortion thereof. The packing ring also has the radially inner periphery thereof maintained in engagement with the insert by means of a light pressure or interference fit. This arrangement, when installed, is subject to axial compression such that opposite axial end faces of the packing ring seat on confronting faces on the insert and gland (or stuffing box) to create seal areas at the axial end faces, rather than at the radially inner and outer peripheral surfaces.

With the improved packing of this invention, the packing provides a highly desirable sealed relationship between the insert and the gland (or stuffing box), and in addition simplifies assembly of the mechanical seal into the stuffing box, particularly when the seal assembly is vertically oriented, by permitting the manual assembly of the parts while involving a secure press fit which can be manually accomplished. At the same time, the resulting press fit of the Teflon packing ring is such that distortion is greatly minimized when the packing ring is subjected to high temperature fluids, and hence leakage is believed substantially minimized.

In the improved mechanical seal assembly of this invention, the insert has a surrounding annular surface on which is sealingly seated the radially inner peripheral surface of the packing ring. This seal is created by means of a pressure or interference fit. An encircling rib is integral with the ring and projects radially outwardly therefrom, whereby the radially outer edge of this rib creates an interference fit with an annular surrounding surface formed on the gland or stuffing box. The rib is axially thin, and positioned centrally of the rectangular blocklike portion of the packing ring, and hence is effective for minimizing distortions caused by high temperatures and differential thermal expansions. The seal areas are created due to the main rectangular blocklike portion of the packing ring being axially compressed between the insert and the gland (or stuffing box), so that the seal faces are hence adjacent the axial faces of the packing, rather than the radially peripheral surfaces thereof.

Other objects and purposes of the invention will be apparent to persons familiar with apparatus of this general type upon reading the following specification and inspecting the accompanying drawings.

Figure 1:
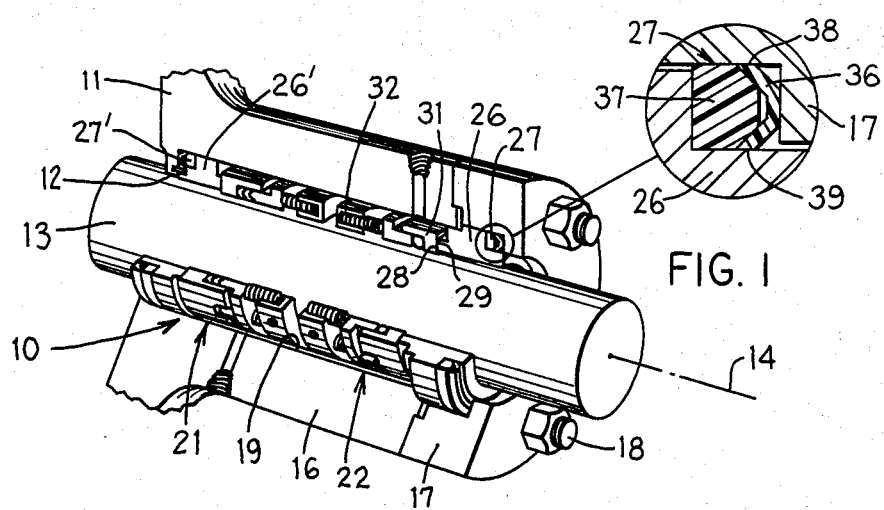
FIG. 1 is a fragmentary perspective view of a conventional mechanical seal construction, specifically a double seal unit.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

FIG. 1 illustrates a known shaft seal construction 10 associated with a wall 11 of a pumping device or other fluid handling apparatus, which wall has an opening 12 through which projects a shaft 13 rotatable about its axis 14. The wall 11 has a sleevelike housing 16 (commonly referred to as a "stuffing box") fixed thereto in coaxial alignment with the opening 12. An annular plate 17, commonly referred to as the "gland", is secured by conventional fasteners 18 to the end of the stuffing box. The stuffing box substantially concentrically surrounds the shaft 13 and defines an annular chamber 19 therebetween.

The chamber 19 contains therein, in the illustrated embodiment, inner and outer seal assemblies 21 and 22, respectively, which create a sealed relationship between the shaft 13 and the stuffing box 16. These seal assemblies are conventional and substantially identical, so that only the outer seal assembly 22 will be described below.

This outer seal assembly 22 includes a stationary seal ring 26 (commonly referred to as the "insert") positioned in surrounding relationship to the shaft 13 but spaced therefrom. This insert 26 is stationarily and sealingly seated in the gland 17, and an appropriate packing ring 27 is provided therebetween to create a sealed relationship. The insert 26 has a seal face 28 on one axial end thereof which is maintained in rotatable sliding engagement with an opposed seal face 29 as formed on the end of the rotating seal ring 31, the latter being interconnected to the shaft 13 for rotation therewith. For this purpose, the rotating seal ring 31 is slidably but nonrotatably connected through appropriate structure, such as pins (not shown), to a collar 32 which is fixed to the shaft 14. Springs 23 normally coact between collar 32 and seal ring 31 so as to axially displace the seal ring 31 relative to the shaft 14 to urge the seal faces 28 and 29 into snug rotatable sliding engagement with one another.

The rear or inner seal assembly 21 is constructed substantially the same except that the insert 26' is, in this variation, stationarily seated on the stuffing box 16 and the packing ring 27' is sealingly interposed therebetween.

The packing 27, as illustrated in FIG. 1 is conventionally of the V-ring spreader type in that it is formed of two rings, the first being a V-ring 36 and the other being a wedgelike spreader ring 37 which fits within the V-ring 36 and deforms the legs outwardly so that seal areas 38 and 39 are created at points of contact with a radial wall on the gland and a radial wall on the insert, respectively. The V-ring and spreader are generally constructed of Teflon which, while not possessing any substantial elasticity, nevertheless does deform and permit sufficient localized compression at areas 38 and 39 to create a sealed relationship. This spreader ring arrangement, which is used both for engagement with the gland and for engagement with the stuffing box, is able to withstand corrosive and/or high temperature fluids. However, manual installation of a seal assembly employing this type of packing 27 or 27' does not permit any secure holding of the insert within the gland or stuffing box, and hence experiences the installation problems previously discussed.

Figure 2:
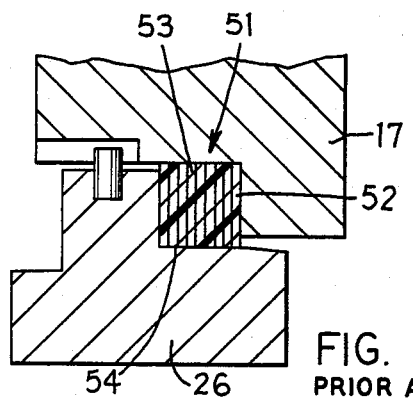
FIGS. 2-4 are all fragmentary sectional views which illustrate known packings as used between the insert and the gland.

FIG. 2 illustrates another known packing which again sealingly cooperates between the insert and the gland. In this instance, instead of utilizing a V-ring packing, there is provided an annular packing ring 51 constructed of a laminated graphite, specifically a plurality of thin graphite plates or layers 52 which are laminated together to form a ring having a substantially rectangular cross section. With this arrangement, the graphite packing 51 creates seal areas 53 and 54 which again are defined by opposed radially directed surfaces as formed on the gland and insert. This graphite packing 51, however, does not in any way act as an elastomeric material, and in fact is rather delicate, although it can be somewhat initially compressed. This material, however, does not have any significant holding strength when installed between the gland and insert, and hence experiences substantially the same type of installation problems as explained above.

Figure 3:
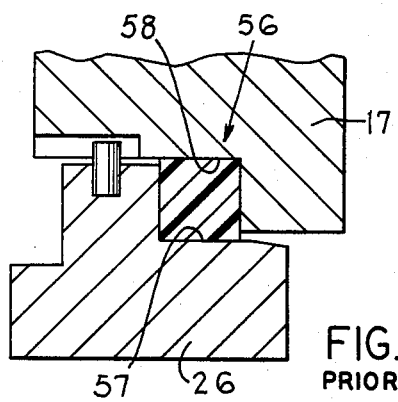

FIG. 3 illustrates still another known packing which has been utilized for many years when the seal assembly is exposed to corrosive and/or high temperature fluids. This packing 56 is formed from a ring of Teflon having a substantially rectangular cross section. With this Teflon packing ring 56, the Teflon does not act as an elastomer and is not readily compressible. Hence, to permit installation of the Teflon ring into the arrangement shown by FIG. 3, it has been necessary to provide a heavy pressure interference fit at both of the areas 57 and 58, since these same radially directed surface areas are utilized for creating the respective sealing areas between the packing ring and the gland and insert. This arrangement, however, due to the interference fits, has not proven wholly acceptable. In fact, this arrangement has normally been utilized only in special-order situations inasmuch as this structure can not be manually assembled and installed at the job site without the use of special equipment for accomplishing the press fits since such fits normally require an axial pressure force of between 50 and 100 pounds, and often more, and since forces can not be easily manually developed and at the same time applied uniform around the ring. Further, due to the heavy press fits between the radially opposed peripheral surfaces, the Teflon packing ring 56 is believed to experience excessive distortion, particularly under high temperature conditions due to the substantially different thermal expansion rates of the engaged components, and this distortion hence increases the difficulty of maintaining the desired sealed relationship. In addition, since it is impossible to precisely control the tolerances on the radial surfaces 57 and 58, and particularly the radial clearance therebetween, this hence significantly affects the magnitude of the resulting interference fits which are created by the Teflon packing ring at the surfaces 57 and 58, and hence can make installation of the Teflon packing ring substantially impossible in some situations, or can result in improper interference fits in other situations so as to prevent creation of the desired sealed areas.

Figure 4:
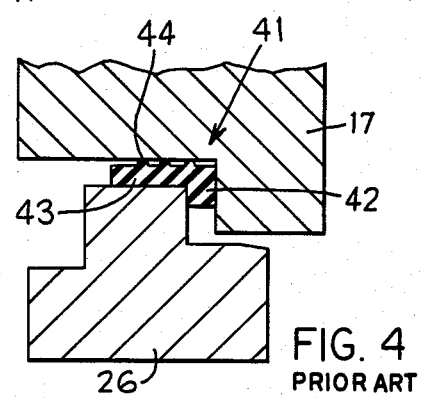

Referring briefly to FIG. 4, this also illustrates a known arrangement wherein an elastomeric packing ring 41 is sealingly engaged between the gland and insert. This elastomeric seal ring 41 is of a substantially L-shaped cross section and has a radial leg 42 which is clamped between axially opposed faces on the gland and insert, and a peripheral or axially extending leg 43 which clamps between opposed surfaces on the gland and insert. This axial leg 43, on the outer periphery thereof, has a series, here three, of small ribs 44 which project radially outwardly thereof, which ribs are effectively of rounded cross section resembling one-half of a circle. These ribs 44 are integral with the elastomeric O-ring and undergo localized deformation so as to sealingly engage the gland wall. This packing ring 41, however, being of elastomeric material, is hence unsuitable for corrosive and/or high temperature fluids, and hence can not be utilized under the environmental conditions typically encountered by the arrangements of FIGS. 1–3.

Figure 5:
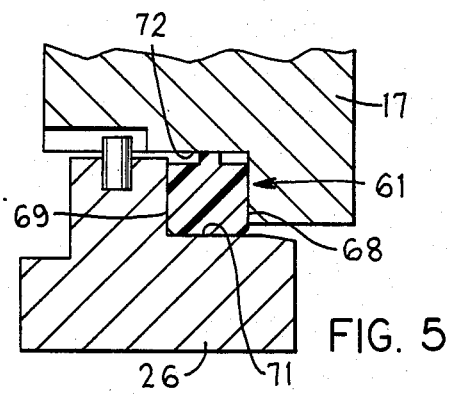
FIG. 5 is a view similar to FIGS. 2-4 but illustrating the improved packing of this invention.
Figure 6:
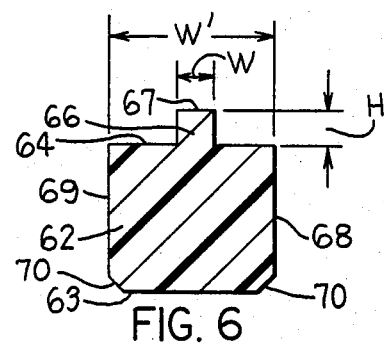
FIG. 6 is a cross section of the improved packing.

Referring now to FIGS. 5 and 6, there is illustrated the improved packing of this invention, which packing is usable with corrosive and/or high temperature fluids, and yet overcomes the disadvantages associated with the arrangements of FIGS. 1–3.

The improved packing ring 61 of this invention is constructed in one piece of a rigid plastic, preferably polytetrafluoroethylene (Teflon) and includes a main body portion 62 which is substantially of rectangular or square cross section, and is defined by radially inner and outer peripheral walls 63 and 64, respectively. This body portion 62 hence resembles the Teflon packing ring 56 of FIG. 3. However, this improved packing ring 61 also has an annular ringlike rib 66 which is integrally fixed to and projects radially outwardly from the peripheral wall 64. This rib 66 is centered substantially at the axial midpoint between the parallel axial end faces 68 and 69 of the body portion 62. The rib 66 has a width W less than about 0.030 inch and preferably has a width W of about 0.014 inch to about 0.018 inch, such that this width W is a small fraction of the overall width W' of the ring 61. In fact, width W is normally about 1/6 to 1/10 the width W'. The radial height H of the rib is generally of a magnitude which is similar to or slightly greater than that of the width W so that the rib hence has a cross-sectional profile which roughly approximates a square. For example, the height H is normally of about 0.022 inch to about 0.026 inch.

The corners 70 at the inner diameter of body portion 62 are preferably provided with a 45° bevel.

The inner peripheral surface 63 of the packing 61 has a light interference fit with the annular surface 71 formed on the gland 26. Similarly, the end surface 67 of the rib 66 also has a light interference fit with the annular surface 72 associated with the gland 17 (or the stuffing box). However, these interference fits are not utilized to create sealing areas, but rather are sufficient to hold the gland 17 and insert 26 together. At the same time the packing 61 is axially compressed between opposed axial faces on the gland and insert so that the sealing areas are hence created at the axial end faces 68 and 69.

To install the insert 26 and packing 61, the packing 61 is first manually pressed onto the insert 26 so as to create the light interference fit between the surfaces 63 and 71. The insert 26, having the packing 61 thereon, is then manually pressed into the bore 72 of the gland 17 to hold the two units together, this being accomplished manually by applying only a light finger pressure force of about 10 pounds or less to the insert to effect the installation. The gland 17 and insert 26 can then be picked up, and inverted so that the insert faces downwardly, so as to permit vertical installation without having to separately hold the insert inasmuch as the packing 61 will properly positionally hold the insert within the gland. In similar fashion, the insert 26 having the packing 61 thereon can be inserted into the inner end of the stuffing box and then properly held in position by engagement of the packing 61 with the stuffing box, even after the gland 26 is manually released, during which the remaining portions of the seal assembly can then be installed in the stuffing box.

The operation of the mechanical seal assembly, when incorporating the improved packing 61, is believed self-evident so that further description thereof is believed unnecessary.

The improved one-piece packing ring 61 of this invention possesses many advantages:

1. It is easier to install, since it is only one piece in relationship to the V-ring and spreader, and installs with hand pressure of low magnitude.

2. It is symmetrical about its central plane, and hence bidirectional, in that it can be installed from either direction, and hence prevents improper installation.

3. It is more economical than the two-piece V and spreader ring arrangement.

4. The same one-piece packing ring 61 can be reused several times without requiring replacement, and without encountering any decrease in sealing ability.

5. It is interchangeable with many of the packing rings, such as V and spreader rings, and O-rings, presently in use.

6. It creates a sufficient interference fit between the insert and the gland (or stuffing box) to prevent the insert from falling out or tilting out of position.

7. It provides sealing areas at the axial end faces, rather than at the inside and outside diameters, and provides substantially greater sealing areas than can be achieved when utilizing the conventional V and spreader ring arrangement.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a mechanical seal construction for creating a sealed relationship between a rotatable shaft and a surrounding stuffing box structure, including a rotatable seal ring surrounding and nonrotatably connected to said shaft, a nonrotatable seal ring surrounding said shaft and nonrotatably connected to said stuffing box structure, said seal rings having axially opposed annular end faces disposed in abutting and relative rotative sliding engagement with one another, and packing ring means creating a sealed engagement between said nonrotatable seal ring and said stuffing box structure, comprising the improvement wherein:

said packing ring means comprises a one-piece packing ring of a substantially rigid plastics material, said packing ring including a main body portion which is of a substantially rectangular cross section and is defined by radially inner and outer annular surfaces joined together by substantially parallel axial end faces which extend substantially perpendicularly therebetween, said packing ring also including a ringlike rib which is integral with and externally surrounds said main body portion and projects radially outwardly from the radially outer annular surface thereof, said rib being disposed substantially midway between said axial end faces and having an axial width which is only a small fraction of the axial width of said main body portion, the radially inner annular surface of said main body portion having a light interference fit with a radially outwardly directed annular surface on said nonrotatable seal ring, the radially outer end of said rib having a light interference fit with a radially inwardly directed surface on said stuffing box structure, the radially outer annular surface of said main body portion being spaced from and free of engagement with said stuffing box structure, one of the axial end faces on said main body portion being sealingly engaged with an opposed surface on said nonrotatable seal ring, and the other axial end face on said main body portion being sealingly engaged with an opposed surface on said stuffing box structure.

2. A seal construction according to claim 1, wherein said rib is substantially rectangular in cross section and has a radial extent which is of a magnitude similar to its axial width.

3. A seal construction according to claim 2, wherein the seal ring has only a single said rib projecting therefrom, and wherein said seal ring is constructed of polytetrafluoroethylene.

4. A seal construction according to claim 2, wherein said rib has an axial width in the range of between 0.010 and 0.020 inch.

5. A seal construction according to claim 1, wherein said stuffing box structure includes an elongated sleevelike housing having a gland ring removably fixed to the free end thereof, said packing ring being engaged directly between said gland ring and said nonrotatable seal ring.

6. A seal construction according to claim 1, wherein said stuffing box structure includes an elongated sleevelike housing having a gland ring removably fixed to the free end thereof, said sleevelike housing at the other end thereof defining an internal shoulder, and said packing ring being disposed at said other end of said sleevelike housing adjacent and in engagement with said shoulder.

7. A seal construction according to claim 1, wherein said main body portion has dimensions extending axially and radially thereacross which are of similar magnitude.

8. A seal construction according to claim 7, wherein said rib has a radial extent of a magnitude which is a small fraction of the radial extent of said main body portion.

9. A seal construction according to claim 8, wherein said rib is of a substantially rectangular cross section and has a radial extent of a magnitude similar to that of its axial width.

* * * * *